United States Patent
Flynn et al.

[11] Patent Number: 6,166,900
[45] Date of Patent: Dec. 26, 2000

[54] MEDIA DRIVE CANISTER VIBRATION DAMPNER AND METHOD OF DAMPENING

[75] Inventors: Timothy M. Flynn; Robert T. Harvey, both of Wichita, Kans.

[73] Assignee: LSI Logic Corporation, Milpitas, Calif.

[21] Appl. No.: 08/990,930

[22] Filed: Dec. 15, 1997

[51] Int. Cl.[7] ............................. H05K 5/00; H05K 7/00
[52] U.S. Cl. .................. 361/685; 361/683; 361/686; 361/726; 361/727; 312/223.1; 312/223.2; 248/638
[58] Field of Search .................... 361/685, 787, 361/683, 686, 726, 727, 730; 312/223.1, 223.2; 248/638, 636, 634

[56] References Cited

U.S. PATENT DOCUMENTS

| | | | |
|---|---|---|---|
| 4,691,826 | 9/1987 | Ozeki | 206/456 |
| 4,749,164 | 6/1988 | Leo et al. | 248/674 |
| 4,893,210 | 1/1990 | Mintzlaff | 360/137 |
| 4,896,777 | 1/1990 | Lewis | 361/399 |
| 5,124,886 | 6/1992 | Golobay | 361/391 |
| 5,269,698 | 12/1993 | Singer | 439/157 |
| 5,381,315 | 1/1995 | Hamaguchi et al. | 361/727 |
| 5,483,419 | 1/1996 | Kaczeus, Sr. et al. | 361/685 |
| 5,564,804 | 10/1996 | Gonzales et al. | 312/223.2 |
| 5,566,049 | 10/1996 | Nguyen | 361/685 |
| 5,579,204 | 11/1996 | Nelson et al. | 361/685 |
| 5,584,396 | 12/1996 | Schmitt | 211/26 |
| 5,586,003 | 12/1996 | Schmitt | 361/683 |
| 5,602,717 | 2/1997 | Leshem et al. | 361/685 |
| 5,668,696 | 9/1997 | Schmitt | 361/685 |
| 5,828,547 | 10/1998 | Francovich et al. | 361/685 |

OTHER PUBLICATIONS

Barracuda 4LP Family Product Manual, Rev. A; 1996 Seagate Technology, Inc.; Dec. 1996; pp. 5–6.
Barracuda 9 Family Product Manual, Rev. B, 1997 Seagate Technology, Inc.; Apr. 1997; pp. 5–6.

*Primary Examiner*—Leo P. Picard
*Assistant Examiner*—Tung Minh Bui

[57] ABSTRACT

A vibration dampening mechanism for operative arrangement with a data storage media drive canister, having: a cantilevered dampening spring secured to a surface of, or integral with, a side of a housing for the drive canister. The spring has a free end that can extend over an aperture through the housing side. The spring can comprise a bent portion, having an outer bend surface, between a secured end and the free encl. When installed in a canister support structure, this outer bend surface will contact an under surface of the structure causing the bent portion to at least partially flatten; the free end may deflect into the aperture. Also, a storage media drive vibration dampening system for operation with a media drive canister support structure having: a cantilevered dampening spring secured to, or integral with, a side of a drive canister housing. And, a method of dampening the vibration of a data storage media drive in operation comprising the steps of: providing a cantilevered dampening spring secured to a surface of, or integral with, a side of a drive canister housing containing the media drive, the side has an aperture through it over which a free end of the spring can extend; and contacting an outer bend surface of a bent portion of the spring with an under surface of a canister support structure to cause the bent portion to at least partially flatten.

26 Claims, 6 Drawing Sheets

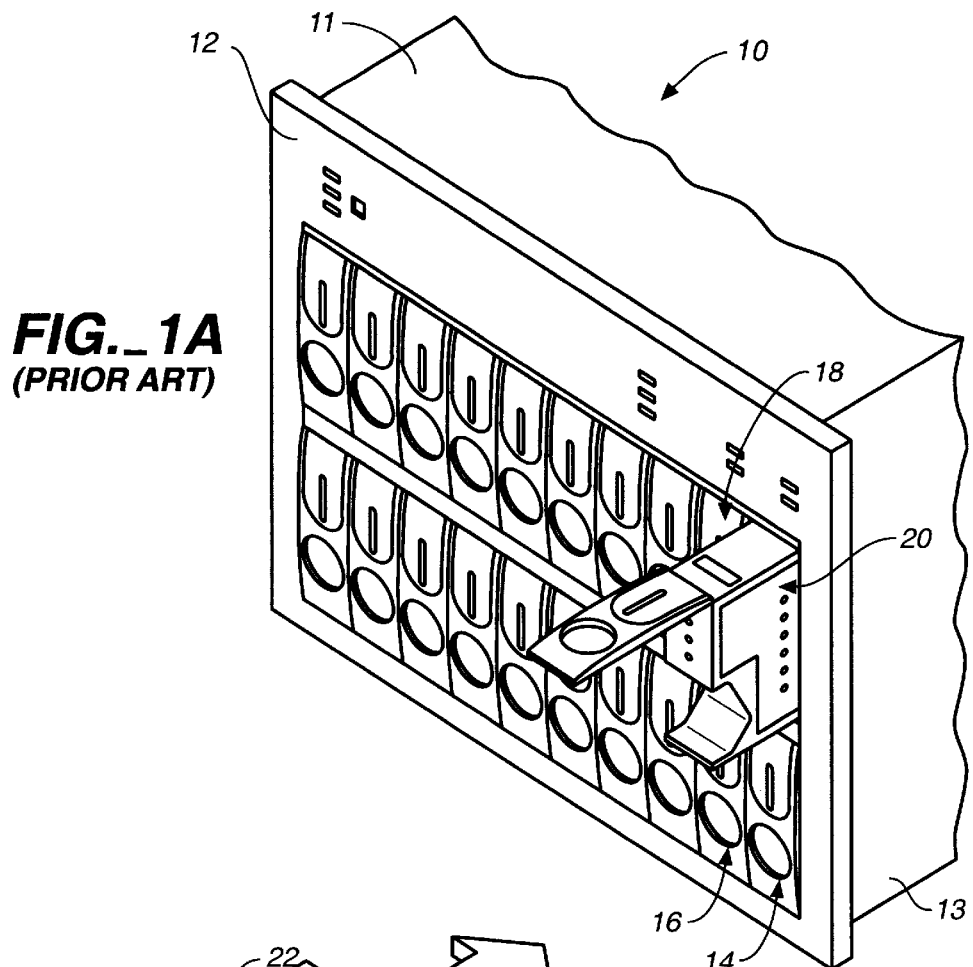
FIG._1A
(PRIOR ART)
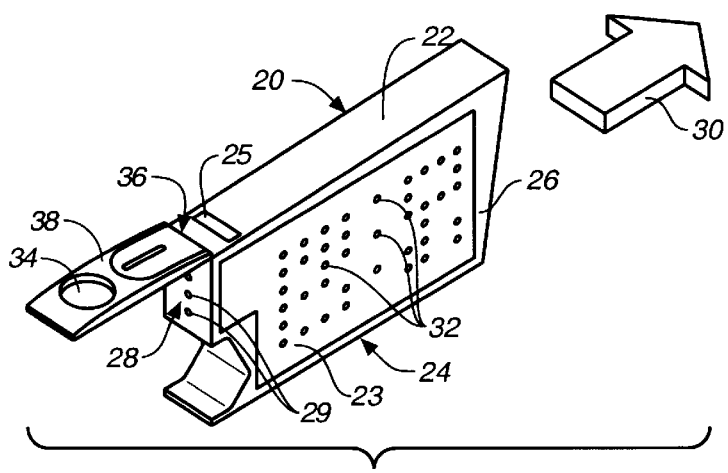
FIG._1B
(PRIOR ART)

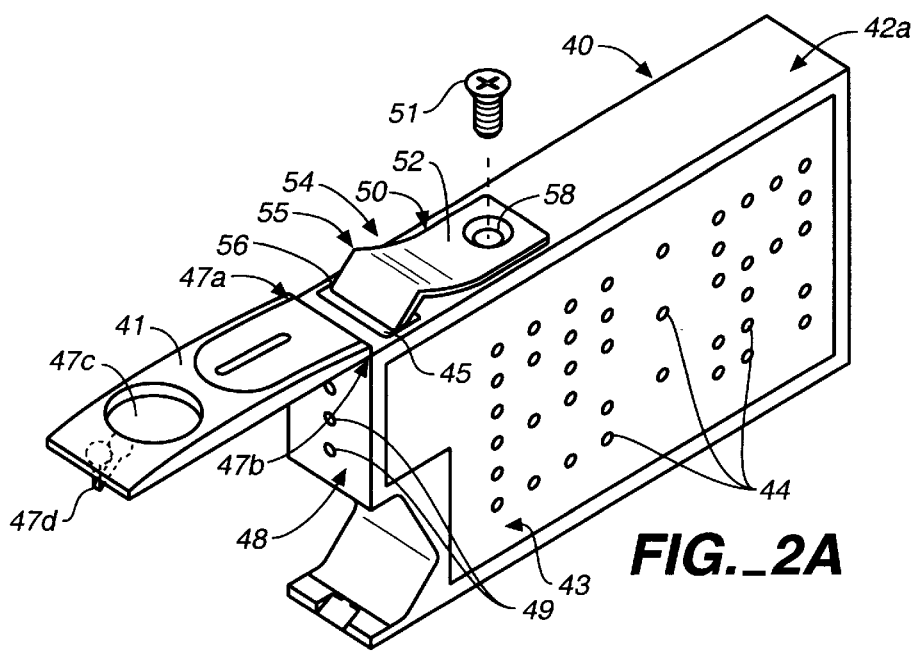
FIG._2A
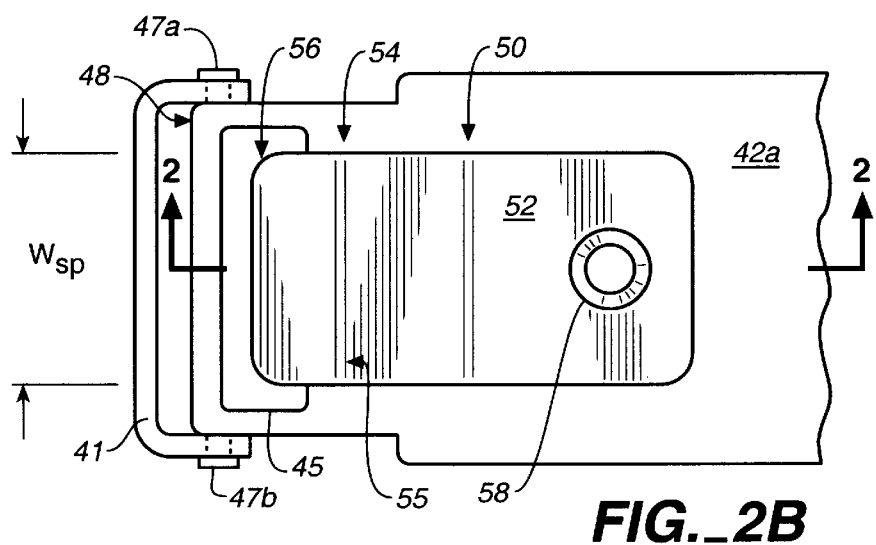
FIG._2B
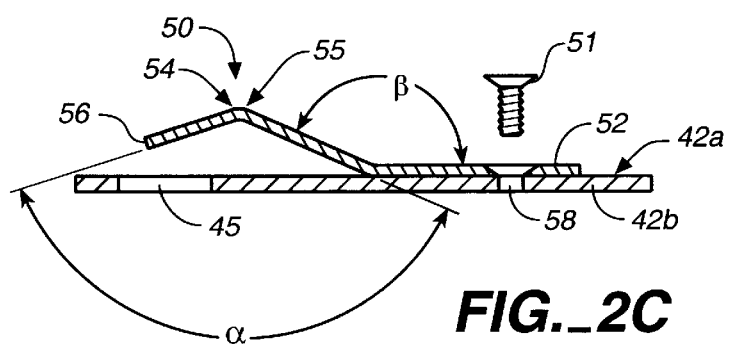
FIG._2C

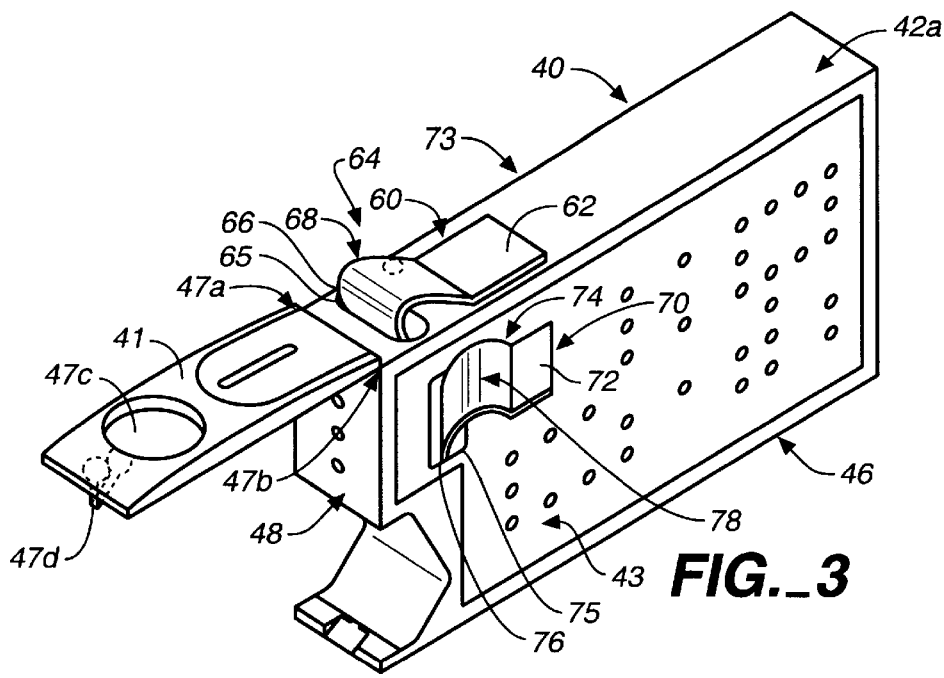
FIG._3
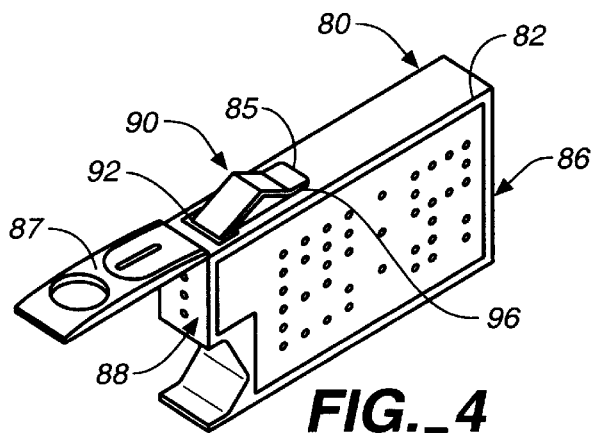
FIG._4
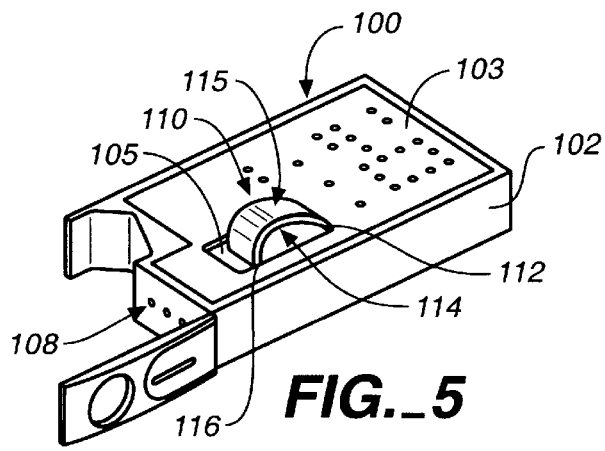
FIG._5

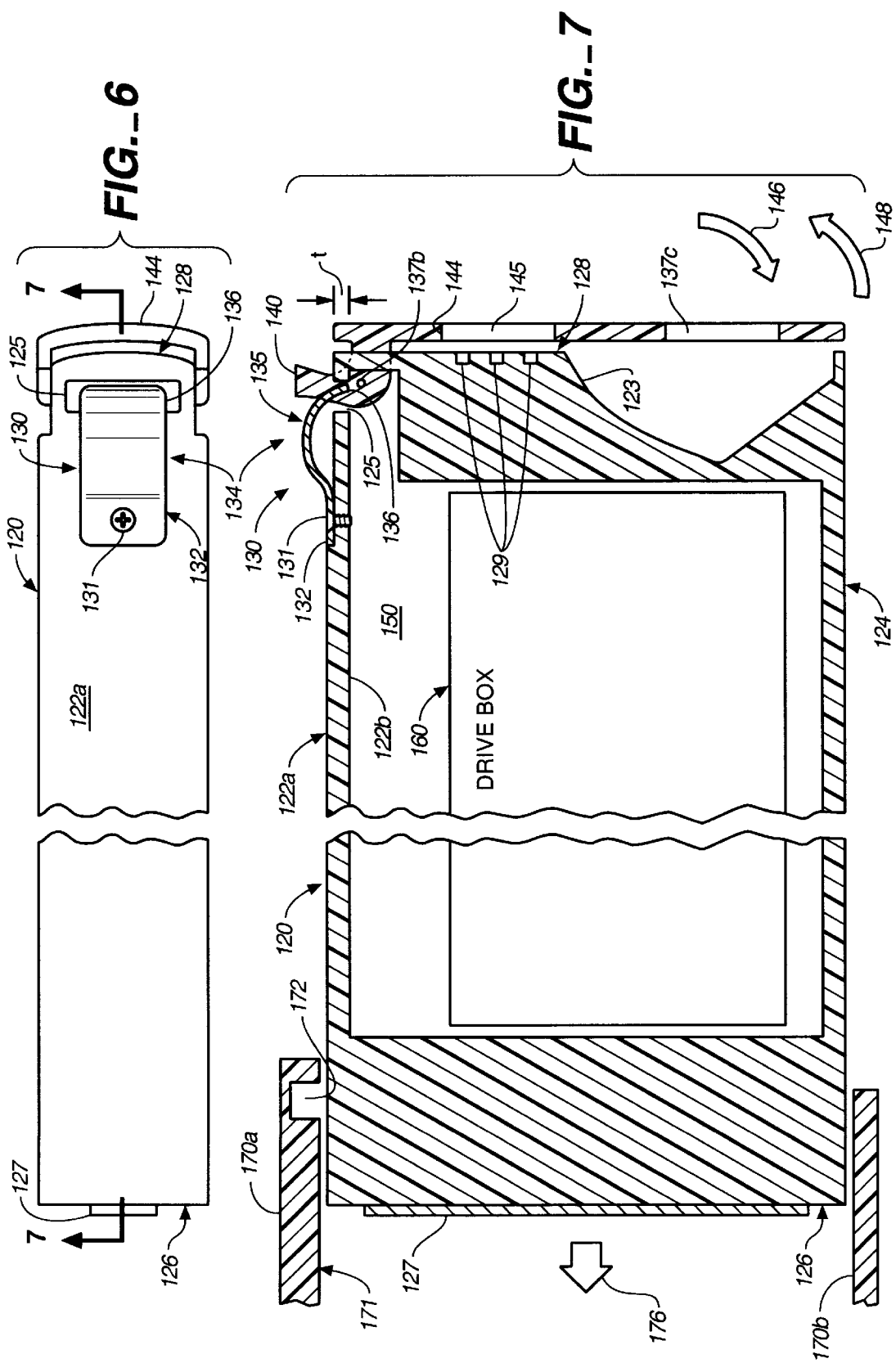

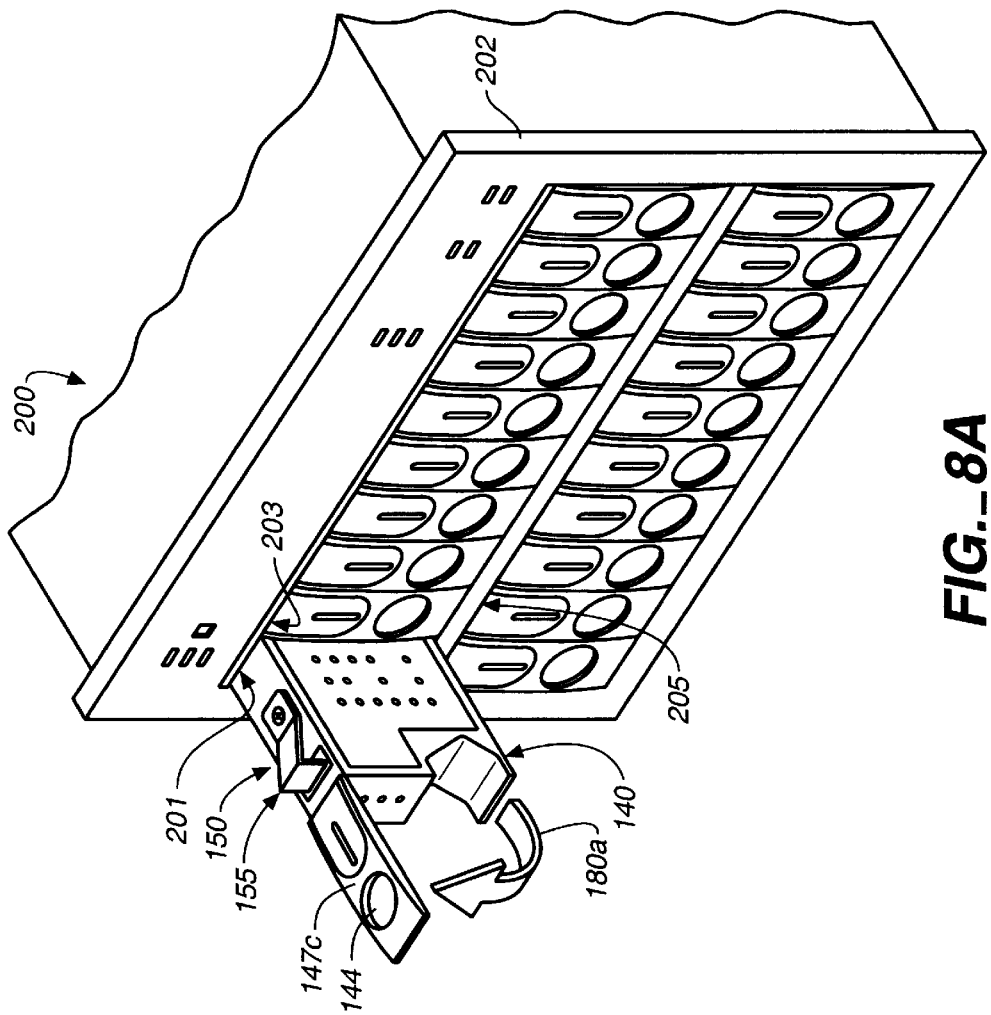
FIG._8A
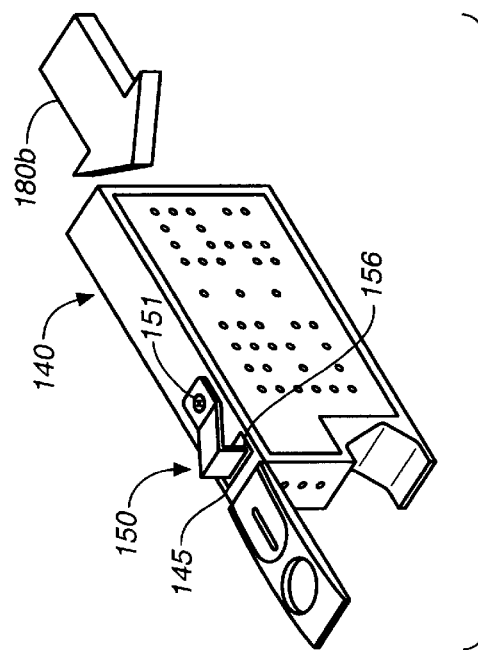
FIG._8B

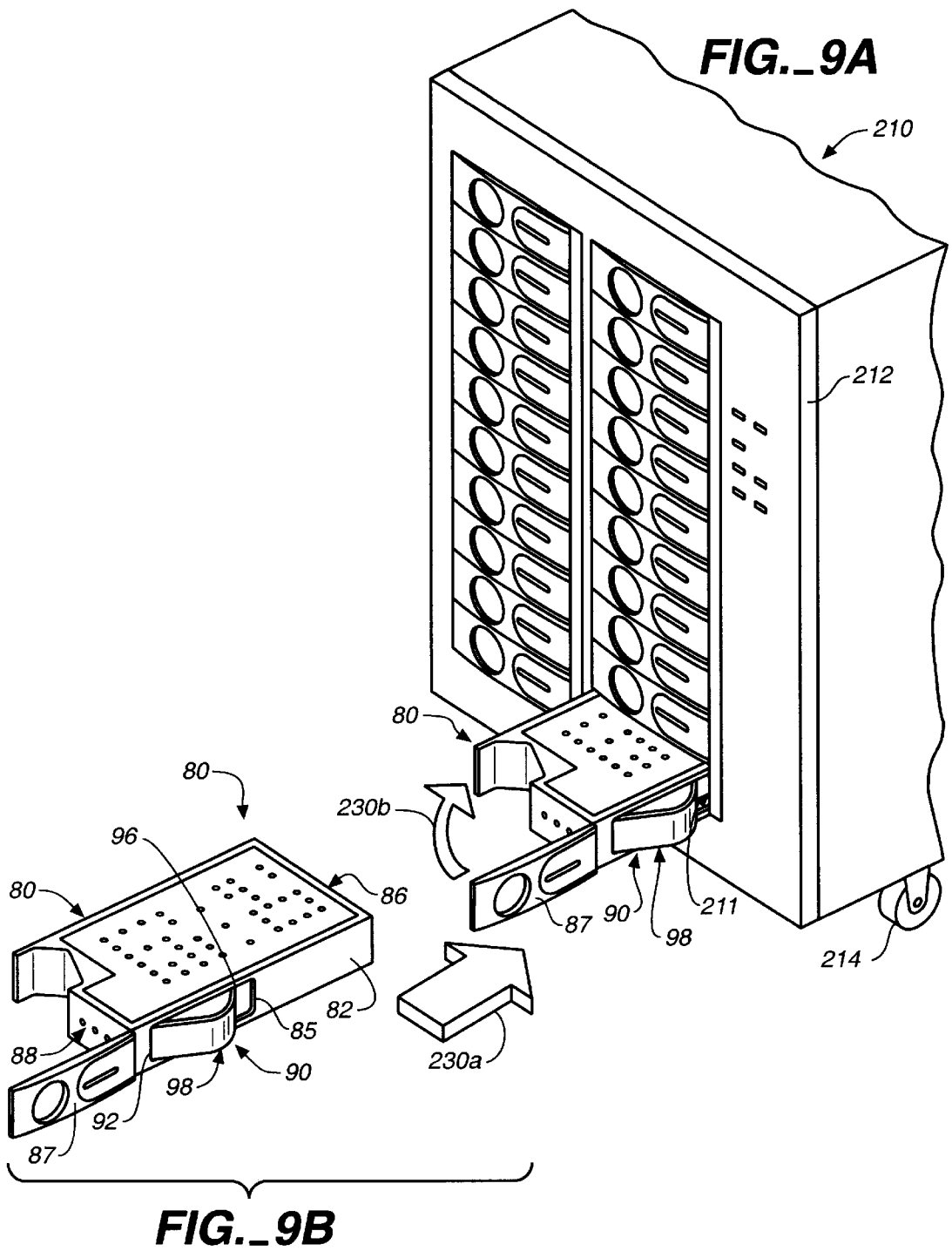
FIG._9A
FIG._9B

MEDIA DRIVE CANISTER VIBRATION DAMPNER AND METHOD OF DAMPENING

BACKGROUND OF THE INVENTION

In general, the present invention relates to magnetic and non-magnetic storage media drive canisters mounted for use within a computing device, and more particularly, to a new vibration dampening mechanism for operative arrangement with a data storage media drive canister that can be installed in a canister support structure located within a computing device, having a cantilevered dampening spring secured to an upper or lower surface of, or integral with, a side of a housing for the drive canister.

So-called "floppy" disk drives (that read 5.5-inch diameter media), the more-commonly used "rigid" disk drives (that read 3.5-inch diameter disks), As well as drives that read other types of magnetic and non-magnetic storage media such as magnetic tapes, laser created and read CD-ROMs (Compact-Disk Read-Only Memory media), and the newer ZIP™ disk storage (distributed by Iomega Corporation), are typically either mechanically built into computing devices (as is the case for most drives built into desktop and laptop personal computers) or can be housed by portable removable canister units that are, then, inserted into computing devices. These removable canister units can be inserted directly into support shelving built into a computing system or subsystem; or if a computing device needs a great deal of extra portable storage, several disk drive canisters can be, first, mounted into a canister mounting module having several bays (also referred to as drive cages) each of which can accept a drive canister. FIG. 6 of U.S. Pat. No. 5,124,886 issued to Golobay illustrates one type of canister mounting module having six canister bays/cages. The assignee hereof has designed and currently distributes another type of canister mounting module (at 10 of FIG. 1A) having canister bays (such as those at 14, 16, 18, 20) located side-by-side and in stacked relationship with one another. Each of these canister bays houses one disk drive canister.

Due to requisite precision during disk read and/or write operations, data storage media drives are susceptible to problems arising from vibration during operation and perturbation due to shock during shipping, installation, and operation. It is well understood that even minuscule displacement of storage media due to mechanical vibration or shock during read or write operations can cause error. The trend in data storage media drive technology is to increase data storage capacity of standard sized media currently in use, and to maintain or increase read/write speed. Thus, even the slightest amount of vibration can cause performance degradation, disk read/write errors, or other unwanted consequences.

One known disk drive canister developed and currently being built and distributed by the assignee hereof for use with its canister mounting module (mentioned above), has an electrical connector mounted on its back end so that upon insertion directly into a computing system, subsystem, or a canister mounting module, the disk drive contained in the canister can be electrically interconnected to the computing device to provide data storage. The assignee's disk drive canister design (FIG. 1B) has a forward end to which a latch-door is attached by means of a pivot. After sliding this canister into its respective bay/cage, its latch-door is closed against the canister to hold the canister in place.

Although it may not be very difficult to build a molded plastic or cast metal alloy disk drive canister housing to precise dimensions, as is the case with the canister housing designed by the assignee hereof and made of reinforced molded plastic, it is much more difficult and costly to build canister shelving and bays/cages with such precision. Since tight tolerances are hard to achieve when building canister shelving and bays/cages, a space is created between the canister housing and its mounting shelving or bay/cage. Although this extra space makes it easier to slide a canister into place within its shelving or bay/cage, there is at least one main drawback: the mechanical vibration or shock due to internal disk drive components in operation or some other perturbance, is magnified as the canister "rattles" between its upper and lower mounting shelving or within its bay/cage. Although connecting the electrical connector of a known canister to its bay/cage provides a small amount of lateral support to the back end of the canister, this incidental support given is simply not enough to minimize or prevent disk read and write operation errors due to vibration or shock. Furthermore, a mounting module housing several such drive canisters, each independently vibrating while in operation, experiences a multiplied vibrational effect. This multiplied vibrational effect, in turn, increases the likelihood of media drive read/write error.

While others have proposed various solutions to address various respective magnetic storage disk vibration and shock issues that they have specifically identified, none of these proposed prior solutions offer a simple, yet effective, means of decreasing or minimizing drive displacement due to vibration or shock during disk drive operation that can accommodate known canister housing and associated bay/cage designs. For example, see U.S. Pat. No. 4,749,164 issued to Leo et al. that discloses a shock and vibration isolation system wherein a device having a top, bottom, sides, front and back is mounted on moving isolators in spaced relationship to a member for releasably holding the device in place against vertical, lateral and longitudinal movement during shipping. The hard disk drive disclosed in U.S. Pat. No. 4,893,210 issued to Mintzlaff is resiliently suspended within a disk pack unit housing on a vibration isolating suspension system which utilizes a plurality of spring steel coils to isolate the hard disk from external vibrations and shock. The 3.5-inch disk drive mounting system in U.S. Pat. No. 5,566,049 issued to Nguyen, which was apparently designed to address disk errors due to shock and vibration displacement, includes a main disk support bracket, first and second disk retainers, and a center disk support bracket. The mounting system in U.S. Pat. No. 4,896,777 issued to Lewis "provides a shock isolation mounting device for slide mounting a disk drive mechanism in the card guide support of a computer chassis, . . . [which comprises] a clamp assembly for clamping the disk drive mechanism in a first inoperative position, and a cam assembly which is displaceable with respect to the clamp assembly for moving the clamp assembly to a second operative position." The information recording carrier-holding frame disclosed in U.S. Pat. No. 4,691,826 issued to Ozeki was designed to "stably (sic) house and hold a small size of a thin information recording carrier such as a floppy disk, a slide film and so on . . . ;" the Ozeki information recording carrier is positioned on a support in a rectangular depression and held between planar lugs and supports. As one can see, these prior proposed solutions are not feasible where space is limited and where one desires not to incur the costs of redesigning current canister housing and associated bay/cage designs.

In proposing solutions to other disk drive problems, several inventors have designed various devices that do not address the problem of canister housing and disk displacement due to vibration or shock during drive operation. Several such devices have been patented: A bracket for securing a computer drive within a housing (U.S. Pat. No. 5,564,804); a sled having an adapter assembly coupled thereto to provide an electrical and mechanical interface between an SCSI compatible disk drive connector and the SCA compatible midplane connector (U.S. Pat. No. 5,579, 204); a disk card cage/disk carrier mechanical interlock subassembly having two pairs of cooperative pins (U.S. Pat. No. 5,602,717); shelving housing and associated carrier (U.S. Pat. No. 5,584,396); a pawl latching and retaining device for retaining and releasing a removable disk drive (U.S. Pat. No. 5,269,698); and a shelf assembly in an electronic switching system to enhance "storability of a cable" and "coolability of the assembly" (U.S. Pat. No. 5,381,315).

In most compact computerized devices designed to house a disk drive canister unit, there is little additional space available to accommodate a redesigned, more-complex canister housing. Without reasonable solutions at hand for adequately supporting storage media drives subject to vibration and shock within a complex electronic instrument, software and computer hardware designers can be severely limited in their development efforts. Therefore, a simple, yet effective, and readily manufacturable solution was needed that could decrease, minimize or prevent disk read/write operation errors caused by vibration and shock. One can see that the novel dampening mechanism of the invention described herein, provides support and stability to known storage media drives without requiring substantial redesign of storage media drive canister units currently in use.

The new vibration dampening mechanism described herein, is designed for operation with a wide range of portable/removable data storage media drive canister units that house or contain a storage media drive subject to vibration or shock during operation. This simple innovative mechanism can be installed as an add-on component to existing canister units or can be fabricated as an integral part of any side (top, bottom, left, or right) of a canister housing. The innovative mechanism of the invention operatively arranged with a drive canister, can be used in existing shelving or canister bays/cages. Since no increase or modification in size or shape of shelving or canister bays/cages is needed, no redesign is necessary of the computing devices into which a canister (that incorporates the instant invention) is inserted. Furthermore, a canister unit incorporating the novel vibration dampening mechanism of the invention, can be inserted and removed with relative ease (and without special tools) by either a computer operator or technician.

Unlike the bracket with flat engaging tabs 304, 402, 406 which fit within respective openings to prevent the bracket from moving in a first degree of freedom relative to the computer housing (described in U.S. Pat. No. 5,564,804), and unlike the led having a pair of sled arms with apertures therein through which steel clips have been disposed so that these clips can be accepted by corresponding holes in a carrier board (described in U.S. Pat. No. 5,579,204), the new vibration dampening mechanism was designed to be secured to a surface of, or integral with, a side of a canister housing to utilize the extra space between a canister housing and its mounting shelving or bay/cage while at the same time minimize modifications to existing canister designs. As will be appreciated, in the spirit of this design goal, the new dampening mechanism and system described herein has a spring that can be located at a top, bottom, left, or right side wall of a canister housing.

SUMMARY OF THE INVENTION

It is a primary object of this invention to provide a vibration dampening mechanism for operative arrangement with a data storage media drive canister that has a cantilevered dampening spring secured to an upper or lower surface of, or integral with, a drive canister housing side having an aperture therethrough. It is also an object of this invention that, either prior to or upon contact of the spring with the under surface of a canister support structure, a free end of the dampening spring can: extend over the aperture; or if already extending over, will "tuck" into the aperture; and if long enough, will also deflect into the interior cavity of the drive canister. Additional objects of this invention include: providing a storage media drive vibration dampening system for operation with a media drive canister support structure that has a cantilevered dampening spring secured to, or integral with, a side of a drive canister housing; and providing a method of dampening the vibration of a data storage media drive in operation having the steps of providing a cantilevered dampening spring secured to a surface of, or integral with, a side of a drive canister housing containing the media drive and contacting an outer bend surface of a bent portion of the spring with an under surface of a canister support structure.

The advantages of providing the new vibration dampening mechanism, the new vibration dampening system, and the new method of dampening the vibration of a data storage media drive in operation, as described herein, are as follows: (a) Vibration and shock during operation of a storage media drive, and media drive perturbation due to shock during shipping and use of a computing device, can be decreased—leading to a reduced risk of read/write error during operation of a computing device; (b) Such a reduction in risk of read/write error can be accomplished without requiring substantial redesign of known media drive canister units currently in use; (c) A canister unit incorporating the novel simple, yet effective, vibration dampening mechanism or method of dampening can be inserted and removed with relative ease and without special tools; (d) Design simplicity—the novel mechanism as designed with few components is inexpensive to build, assemble/incorporate with a storage media canister, and replace if broken; (e) Design flexibility—the novel mechanism can be located at a top, bottom, left, or right side of a canister housing, depending upon available space; (f) Versatility—the novel dampening mechanism or method can be incorporated with a wide variety of drive canister sizes and shapes used in existing computing devices, without requiring substantial modification to the canister housings or the bays/cages or shelving into which they are installed; and (g) No additional space within a canister bay/cages or shelving is required to incorporate the novel dampening mechanism or method of the invention into an existing computing device.

Briefly described, the invention includes a vibration dampening mechanism for operative arrangement with a data storage media drive canister. The mechanism has a cantilevered dampening spring secured to a surface of, or integral with, a side of a housing for the drive canister. The housing side has an aperture therethrough and the spring has a free end that can extend over the aperture either prior to, or upon, contact with an under surface of a canister support structure. The spring can be located closer to a front end of the canister housing than the housing back end. The spring can also comprise a bent portion, having an outer bend surface, between a secured end and the free end. The outer bend surface can be shaped into many different configurations. When installed in a canister support structure, this outer bend surface will contact an under surface of the canister support structure causing the bent portion to at least partially flatten. This contact of the outer bend surface can cause the free end to extend over and deflect (or "tuck") into the aperture in the housing side. The secured end can be connected with the canister side by many suitable means: screw or bolt, rivet, an adhesive, weld joint, thermal bond, and so on. To address drive vibration, additional dampening mechanisms can be operatively arranged with a drive canister.

Also characterized herein, is a storage media drive vibration dampening system for operation with a media drive canister support structure. This system has a cantilevered dampening spring secured to, or integral with, a side of a drive canister housing. The spring has a bent portion between a secured end and a free end; this bent portion has an outer bend surface for contact with an under surface of the support structure into which the drive canister housing can be installed. The housing side can have an aperture over which the free end of the spring can extend either prior to, or upon, contact with the under surface of the support structure.

The invention also includes a method of dampening the vibration of a data storage media drive in operation. This method comprises the steps of: providing a cantilevered dampening spring secured to a surface of, or integral with, a side of a drive canister housing containing the media drive, the side has an aperture through it over which a free end of the spring can extend; and contacting an outer bend surface of a bent portion of the spring with an under surface of a canister support structure to cause the bent portion to at least partially flatten. A latch-door can be pivotally mounted in proximity to the spring to generally cover the front end of the canister housing; then, the step of contacting can further comprise the closing of this latch-door against the front end of the housing.

BRIEF DESCRIPTION OF THE DRAWINGS

The invention will be more particularly described by referencing the accompanying drawings of the preferred embodiments, in which like numerals designate like parts.

FIG. 1A is an isometric view of a canister mounting module 10 which the assignee thereof has designed and currently distributes, having many canister bays located side-by-side and in stacked relationship with one another.

FIG. 1B is an isometric view of a disk drive canister developed and currently being built and distributed by the assignee hereof for insertion into (along direction 30) the canister mounting module shown at 10 in FIG. 1A.

FIG. 2A is an isometric view of a preferred vibration dampening mechanism of the invention operatively arranged with a storage media drive canister 40.

FIG. 2B is a partial top plan view of the mechanism shown in FIG. 2A arranged with the canister housing (and for simplicity, fastener 51 has been excluded from this figure), illustrating the proximity of the dampening spring 50 to canister front end 48.

FIG. 2C is the partial sectional view taken along 2—2 of FIG. 2B illustrating a preferred arrangement of dampening spring 50 with canister top side 12b.

FIG. 3 is an isometric view of an alternative embodiment of the invention including a spring 60 secured to canister top side 42a and another spring 70 secured to the right-hand side 43 of canister 40.

The isometric views labeled FIG. 4 and FIG. 5 illustrate alternative embodiments of the invention: springs 90 and 110 are shown integral with canister sides 82 and 103, respectively. Drive canisters 80 and 100 are oriented in different directions.

The top plan, partially broken-away view in FIG. 6 illustrates, yet, another embodiment of the invention; for simplicity, no canister support structure is shown.

FIG. 7 is the sectional view taken along 7—7 of FIG. 6 illustrating mechanism 130 secured to the outer surface 122a of canister top side 122b. Also in view is a partial cross-section of the top 170a and bottom 170b of a canister support structure, such as shelving or a canister bay/cage.

FIGS. 8A and 8B are isometric views illustrating the removal of a drive canister 140 incorporating an alternative mechanism of the invention, from mounting module 200. The portable canister unit shown (at 140) could house a rigid disk drive or any drive that reads/recovers data from magnetic and non-magnetic storage media such as floppy disks, magnetic tapes, CD-ROMs, and the newer ZIP™ disk storage.

FIGS. 9A and 9B are isometric views illustrating the insertion of drive canister 80 (shown also in FIG. 4) incorporating an alternative mechanism of the invention, from self-standing mounting module 210. The portable canister unit shown could house a rigid disk drive or any drive that reads/recovers data from magnetic and non-magnetic storage media such as floppy disks, magnetic tapes, CD-ROMs, and ZIP™ disks.

DETAILED DESCRIPTION OF THE PREFERRED EMBODIMENTS

A computing device that requires a great deal of extra data storage can be electrically connected to a canister mounting module such as module 10 shown in FIG. 1A which was designed, and is currently being distributed, by the assignee of this invention. Each canister bay/cage (located side-by-side and in stacked relationship with one another within a forward panel 12) can accept and house a drive canister unit. A few of the canister units installed in mounting module 10 have been labeled at 14, 16, 18, 20 for reference. The top 11 and side 13 of module 10 are sized for mounting within a computing device with forward panel 12 positioned to face outward for easy access to the canister units.

FIG. 1B shows portable disk drive canister 20 just prior to insertion in the direction of arrow 30 into module 10 of FIG. 1A. Canister 20, also designed and currently being distributed by the assignee hereof, has a forward end 28 to which a latch-door 38 with a finger-hole 34 is attached by means of a pivot assembly located at or along edge 36. After sliding canister 20 into its respective bay/cage, latch-door 38 is closed by "snapping" the door into place against front end 28 of the canister to hold the canister within its bay. The sides of the molded plastic housing for canister 20 have been labeled for reference: top side 22, bottom side 24, front end 28, and back end 26. Top side 22 has a :mold release tooling slot 25 incorporated to aid in the process of releasing a finished plastic housing from its mold. Top side 22 also has mounting holes (for simplicity, not shown or labeled) for mounting the disk drive assembly to the canister housing. Front end 28 has small holes labeled 29 that represent indication Light Emitting Diodes (LEDs) that are in view to determine whether the drive canister unit is operating. Since it is important that the drive located within canister unit 20 be maintained at a safe operating temperature, vent holes (for simplicity, not shown or labeled here) have been located in the indented surface beneath indication LEDs 29, to vent heat generated by the canister. Additionally, right-hand side 23 has vent holes labeled for reference as 32.

The novel dampening spring labeled generally at 50 in FIG. 2A, can be secured to top side outer surface 42a by way of a fastener such as a Phillips screw (shown in exploded fashion at 51) that can be screwed into corresponding counter-sunk hole 58. As one can appreciate, depending upon the material of the surface to which generally planar portion 52 is secured, many suitable fastening means are available (see, also the cross section in FIG. 2C): screw(s), rivet(s), a nut and bolt, a weld-joint, material-compatible adhesives, nylon hooks-and-loops (such as VELCRO™, thermal-bonding (if the canister housing is plastic), etc. Although the type of fastener is not critical, it must be able to adequately secure planar portion 52 to the side of canister 40 when outer bend surface (shown generally at 55) of bent portion 54 contacts an under surface of a support structure (for simplicity, not shown in FIG. 2A) upon installation of the canister unit 40 in a support structure. Free end 56 extends over aperture 45 in side 42b (FIG. 2C). Canister unit 40 has a forward end 48 to which a latch-door 41 (with a finger-hole 47c and latch 47d) is attached by means of a pivot/hinge-type assembly located at or along the edge of latch-door 41 between the corners labeled 47a, 47b. Right-hand side 43 has vent/cooling holes labeled 44 (additional vent holes can be added to forward end 48) to vent heat generated by a drive in operation within the canister. Front end 48 is shown with indication LEDs (labeled 49) for determining whether the drive canister unit is operating.

FIG. 2B is a top plan view illustrating several novel mechanism features: bent portion 54 (having an outer bend surface 55) is located between generally planar portion 52 (having a counter-sunk hole 58 therethrough) and a free end 56 of cantilevered spring 50.

In this view, the outer width of free end 56 has been labeled $w_{sp}$ for reference. Although the particular shape of aperture 45 is not critical, in the event free end 56 is positioned so that it "tucks" into aperture 45 upon contact of outer bend surface 55 with the under surface of a canister support structure (not shown), one can appreciate that the width of aperture 45 must be greater than $w_{sp}$. Although not critical, a key advantage to having free end 56 tuck into aperture 45 upon contact of the spring 50 with an under surface (at 171 in FIG. 7) of a support structure, is that as a canister 40 is pulled from its shelving or bay/cage (such as the one shown at 201 in FIG. 8A) free end 56 is less likely to catch or get hung up along the under surface or an edge of a support shelving/bay/cage. As one can appreciate, if free end 56 were to catch during removal (or insertion) of the canister unit, the spring could be severely disconfigured or break. As discussed above, a fastening means; such as a screw or bolt (for simplicity, not shown) can be used to secure spring 50 to a surface (such as 42a) of a side of canister 40. In the event planar portion 52 is secured to a. side's lower/inside surface, it will be hidden in a top plan view. The top plan view in FIG. 2B provides greater detail of one latch-door hinge assembly (47a, 47b) designed and currently being distributed by the assignee hereof to pivotally mount latch-door 41. Latch-door 41 covers front end 48.

The cross-sectional view of FIG. 2C, taken along 2—2 of FIG. 2B, illustrates additional design features that further distinguish the mechanism of the invention from known disk vibration solutions. As shown, free end 56 of spring 50 (in its unloaded state) extends over aperture 45 of side 42b. Note that the free end 56 of unloaded spring 50 can be designed to also extend into the aperture (as shown in the FIG. 7 embodiment). Additionally, although not shown here, free end 56 can be moved back and positioned on surface 42a so that it extends over aperture 45 only upon contact of outer bend surface 55 with a support structure (such as FIG. 7 top 170a and bottom 170b shelving). Depending upon the shape into which spring 50 has been configured, it may become critical that free end 56 be positioned so that either prior to, or upon, contact of spring 50 with an under surface of a support structure, free end 56 will tuck into aperture 45 to prevent getting hung up during removal or insertion of canister 40. A screw 51 is, again, shown in FIG. 2C in exploded fashion. This fastener can be used to secure planar portion 52 to side 42b through hole 58. Outer bend surface 55 of bent portion 54 is shown as an inverted V-shape, although many different shapes are contemplated and illustrated throughout these figures. The angles labeled a and P represent, respectively, 140 degree and 160 degree bends in spring 50. Although the invention is not limited as such, this inverted V-shape of spring 50 can be manufactured and readily operatively arranged with known drive canister unit designs with little, or no, canister redesign necessary.

Canister housings can be made of suitable durable molded plastic, cast metal alloy, or plastic reinforced with metal (which can be molded, cast, and machined to precise dimensions if desired). Dampening spring 50 is preferably made out of a material capable of elastic deformation (that is to say, the deformation generally disappears upon release of the load/force being applied to the material). Suitable materials for spring designs shown throughout include: spring steel and other metal alloys; resilient durable plastics that can be deformed without breakage upon the application of force to the bent portion of the spring; and other materials capable of demonstrating desirable spring load-deforming behavior. Whether deformation of a spring is completely elastic depends upon the size of the load/force and the length of time the load/force is applied. As one increases the load applied to an elastic-plastic material shape (i.e., it exhibits both types of deformation), initially elastic deformation is observed, a point will be reached at which permanent bending/deformation occurs and remains after release of the load (referred to as plastic deformation). Upon the application and release of a force to outer bend surface 55 equal to that applied with the under surface of a structure (such as that labeled 171 in FIG. 7), bent portion 54 will at least partially flatten to deform spring 50. Sustaining such a force for a long period of time will likely cause some permanent deformation of spring 50. This is of no serious consequence. Replacement of a severely permanently deformed or fractured dampening spring secured to a canister unit can be accomplished with relative ease. It is critical that spring 50 be made of a material so that its outer bend surface provides enough counter-force against the under surface of a canister support structure to address the mechanical vibration due to internal disk drive components in operation or some other perturbance, to decrease storage media record and/or data recovery errors.

FIG. 3 illustrates canister 40 of FIG. 2A modified to include alternative springs 60 and 70 operatively arranged therewith. This figure illustrates the design flexibility of the mechanism of the invention. Where space is available between a canister housing and its support structure (such as shelving or a bay/cage), additional dampening springs may be desired to address severe vibration during storage media drive operation. Additional springs (not shown) may be secured to bottom side 46 and left-hand side 73. Spring 60 is shown with its generally planar portion 62 secured to outer surface 42a by suitable means (discussed above). The outer bend surface 68 of bent portion 64 is generally hook-shaped.

Free end 66 extends over aperture 65. Spring 70 is shown with its generally planar portion 72 secured to the outer surface of right-hand side 43 by suitable means. The outer bend surface 78 of bent portion 74 has been shaped to comprise an arc. Free end 76 extends over aperture 75. As also shown in FIG. 2A, canister unit 40 has a forward end 48 to which a latch-door 41 (with a finger-hole 47c and latch 47d) is attached by means of a pivot/hinge-type assembly located at or along the edge of latch-door 41 between the corners labeled 47a, 47b.

The design flexibility of the instant invention is further illustrated in FIGS. 4 and 5.

The canister unit labeled 80 in FIG. 4 has a side 82 from which spring 90 has been cut using known stamping, routing, or thermal-cutting techniques and formed into an inverted V-shape, while remaining integral with side 82. If side 82 is a molded or cast piece, spring 90 can be formed by building the spring's shape into the mold. Aperture 85 results from the cut-away portion of side 82 to form spring 90; if spring 90 is molded or cast, aperture 85 could be shaped as desired and built into the mold. Free end 96 of spring 90 extends over aperture 85 and is positioned between spring integral end 92 and the back end 86 of canister 80. Canister unit 100 in FIG. 5 has a side 103 from which spring 110 has been cut and formed using known techniques to include a bent portion 114 having an outer bend surface 115 comprising an arc. Aperture 105 results from cutting-away a portion of side 103 to form spring 110. Free end 116 of spring 110 extends over aperture 105 and is positioned between spring integral end 112 and the front end 108 of canister 100.

Springs 90 and 110 (shown in FIGS. 4 and 5) will, necessarily, be made of the same material as the housing sides from which they are molded, cast, or cut and formed. Therefore, it is preferred that the sides (labeled 82 and 103) from which springs 90 and 110 are cut, be made of a resilient durable material suitable for carrying out the critical function of the dampening mechanism of the invention (this has been discussed above in connection with canister 40 of FIGS. 2A and 3). Since springs 90 and 110 are integral with their respective canister housings, one can appreciate that replacing a severely deformed or fractured spring of this type may require: completely replacing the housing side with a new side having an integral spring; providing a partial or full patch over apertures 85, 105 prior to securing a new spring over the patch so that its free end can extend over the aperture; or placing the secured end of a replacement spring at a new location so that its free end extends over the existing aperture.

FIGS. 6 and 7 illustrate two views of another alternative embodiment of the invention. The top plan view of canister 120 in FIG. 6 is shown, for simplicity, without a canister support structure such as the shelving/bay/cage shown, in part, in FIG. 7 (the top of which is labeled 170a and the bottom of which is labeled 170b). Canister 120 has a front end 128 covered generally by latch-door 144 pivotally mounted (see right-hand hinge 137b in FIG. 7) to the canister housing. Canister 120 also has a back end labeled 126 having an electrical connector 127 mounted thereon (described in further detail in connection with FIG. 7). A generally planar portion 132 of dampening spring 130 is secured with a counter-sunk Phillips screw 131 to outer surface 122a. As discussed above in connection with FIGS. 2A and 2C, depending upon the material of the surface of side 122b to which generally planar portion 132 is secured, many suitable fastening means are available: screw(s), rivet (s), a nut and bolt, a weld-joint, material-compatible adhesives, nylon hooks-and-loops (such as VELCRO™), thermal-bonding (if the canister housing is plastic), etc. Although the type of fastener is not critical, the fastening means must be able to adequately secure spring 130 to the side of canister 120 when outer bend surface (shown generally at 135 in FIG. 7) of bent portion 134 contacts an under surface (labeled 171 in FIG. 7) of a support structure upon installation of the canister unit 120 in a support structure (top 170a and bottom 170b labeled in FIG. 7). Free end 136 extends over aperture 125 in side 122b (see, also, the cross-section in FIG. 7).

The sectional view in FIG. 7 (taken along 7—7 in FIG. 6) illustrates planar portion 132 of spring 130 secured (in flush-mounted fashion using a screw 131) to the outer surface 122a of canister housing top side 122b. Free end 136 extends over and into aperture 125 a distance approximately equal to the thickness (labeled "t") of side 122b such that upon contact of outer bend surface 135 of bent portion 134 with under surface 171, free end 136 will deflect into interior cavity (labeled 150) of the canister unit 120. Outer bend surface 135 as shown, here, comprises an arc having a suitably-size radius (here, approximately 1 inch). The rectangle labeled 160 represents the general location of at data storage media drive that can record and/or recover data from magnetic and non-magnetic storage media such as a rigid disk (3.5-inch), a floppy disk (5.5-inch), magnetic tapes, CD-ROMs, and Iomega Corporation's ZIP™ disk storage.

As mentioned above, the back end 126 of canister 120 has an electrical connector 127 mounted thereon so that upon inserting the canister 120 directly into a computing system, subsystem, or a canister mounting module (such as module 200 in FIG. 8A), the disk drive contained in canister 120 will be electrically interconnected to the computing device to access power (to operate) and to provide extra data storage for the computing device. Also shown in FIG. 7, is a portion of the top shelf 170a and bottom shelf 170b of a canister support structure (such as shelving or a canister bay/cage) built either directly into a computing system or subsystem, or into a canister mounting module. Front end 128 has three indication LEDs 129 in easy view through hole 145. Front end 128 also should have a few vent holes (not shown, but are located beneath LEDs 129) that extend through the canister housing's front side labeled 123 to aid in cooling of storage media drive 160 in operation. Latch-door 144 has a finger-hole 137c and an opening 145 that allows one to see LEDs 129 when latch-door 144 is down/closed. The canister housing, although illustrated as a single molded or machined piece of durable plastic, can be made off separately molded or machined side pieces of metal, metal-reinforced plastic, durable plastic, or other suitable material, and assembled with a suitable adhesive, by thermal bonding, or mechanical fasteners such as screws or bolts.

Latch-door 144 must first swing "up" in the direction of arrow 148 prior to sliding the canister 120 (along the direction of arrow 176) into place within its support structure (170a, 170b). Swinging latch-door 144 up (arrow 148) pulls lever ear 140 back and out-of-the-way so that side 122b can easily slide into place beneath under surface 171 as bottom side 124 rests on support structure bottom shelf 170b. Once canister 120 is nearly into place within its support structure, latch-door 144 must swing "down" in the direction of arrow 146 to position lever ear 140 into its corresponding recess 172 of top shelf 170a (see, also, FIGS. 8A and 9A for the operation of similar latch-doors). Very unique to the mechanism design of this invention, is that spring 130 has been positioned in proximity to the pivot/hinge-assembly (one side of which is labeled 137b) to better utilize the mechanical leverage provided by the swinging down (arrow 146) of latch-door 144 and the "snapping" in place of lever ear 140 into recess 172. Whether or not a latch-door is included to cover the front end 128 of canister 120, it is preferred that spring 130 be positioned closer to front end 128 than back end 126 to make it relatively easy to slide canister 120 into its support structure (170a, 170b). As the canister unit 120 is being inserted into its support structure (170a, 170b), outer bend surface 135 of bent portion 134 will not contact under surface 171 to deflect free end into cavity 150 until most of the canister 120 is already in place between top and bottom shelves 170a, 170b. This unique design allows canister 120 to be slid, generally unobstructed, into its support structure most of the way until only a couple of inches are remaining when extra force will be necessary to deform bend portion 134 and connect canister electrical connector 127. As one can appreciate, the amount of extra force needed to flatten bend portion 134 to fit it between outer surface 122a and under surface 171 will depend upon the spring's stiffness.

FIGS. 8A and 8B illustrate the removal of a canister 140, having an alternative dampening mechanism operatively arranged therewith, from a mounting module 200 that can be built into and electrically connected to a computing device. Each canister bay/cage, such as the cages labeled 201, 203, 205 located side-by-side and in stacked relationship within a forward panel 202, can accept and house a drive canister unit. A computer operator or technician can "open" latch-door 147c by using finger-hole 144 to swing the latch-door in the direction of arrow 180a. Upon doing so, canister 140 is initially released from module cage 201. As canister unit 140 is pulled out of cage 201 in the direction of arrow 180b, once outer bend surface 155 is no longer in contact with the under surface of cage 201, spring 150 is allowed to return to an unloaded shape. Whether or not spring 150 has only been elastically deformed (i.e., it returns to its preloaded shape upon release of the load), depends upon the specific load-deformation behavior exhibited by the material from which spring 150 has been formed (see, also, discussion in connection with FIG. 2C). FIG. 8B illustrates spring 150 (after it has been released) secured with a screw 151 to canister 140 so that its free end 156 extends over aperture 145.

FIGS. 9A and 9B illustrate the insertion of canister 80 (also shown in FIG. 4) along direction arrow 230a into cage 211 located within a forward panel 212 of a portable mounting module 210 (which can be transported using rollers 214). Module 210 can be electrically connected to a computing device (not shown). Canister 80 is shown with spring 90 in an unloaded state prior to insertion. One can see that free end 96 extends over aperture 85 (created by the area cut-out of side 82 to form spring 90), and that integral end 92 is positioned closer to front end 88 than back end 86. Free end 96 could also extend partially or completely into aperture 85 if spring 90 is so formed. As shown in FIG. 9B, latch-door 87 is in its "open" position prior to insertion in the direction of arrow 230a. The insertion of canister 80 into cage 211 is generally unobstructed until spring outer bend surface 98 contacts the under surface of cage 211. At that point, extra force will be necessary to finish inserting the canister and to electrically connect it to module 210. Latch-door 87 has been designed to swing "down" in the direction of arrow 230b to snap the canister 80 into place. Again, although not limited as such and unlike known drive vibration dampening solutions, one can appreciate that the unique positioning of integral spring 90 closer to front end 88 than back end 86 allows canister 80 to slide into cage 211 with ease, unobstructed, most of the canister's length.

A well known supplier of disk drives is Seagate Technology, Inc. which distributes several drives that record and recover data on magnetic 3.5 inch rigid discs—such as the BARRACUDA™ 9 and BARRACUDA™ 4LP drive families—that require dampening when in operation within canisters (such as those labeled herein at 40, 80, 100, 120, and 140) inserted within shelving or bays/cages of a mounting module. By way of example only, a mechanism of the invention has been built with a dampening spring formed of 0.015 inch thick spring steel into an inverted V-shape (such as that shown in FIG. 2C) and secured with an off-the-shelf 6–32 counter-sunk screw to the top side of a canister molded and machined (using well known molding and machining tools and techniques) of plastic reinforced with metal having a rectangular aperture such as that shown at 45 in FIG. 2A in its top side. Representative dimensions of the inverted V-shape spring are ¾ inch wide and 1.5 inch long. As discussed, the dampening spring can be shaped into many configurations and be made of metal alloys, lightweight plastics, and other suitable resilient, durable materials. Although a screw has been used by way of example, any of the other types of suitable securing means discussed and contemplated hereby, can be used to adequately secure the spring to a surface of a side of the canister.

A latch-door such as that shown at 144 in FIG. 7, was built and pivotally mounted to the top front edge of the canister housing to provide mechanical leverage/advantage to aid in snapping the canister into-place, and to aid in initially releasing the canister upon removal from its bay/cage. By way of example only to give a general idea of the size of one type of disk drive mounted within a canister, off-the-shelf 3.5 inch rigid disk drives are generally housed in an industry standard rectangular box approximately 5.75 inches long, 4.0 inches wide, and 1.63 inches high. A suitable molded plastic or cast metal canister unit built to house off-the-shelf rigid disk drives can have the following dimensions: 4.5 inches high, 2 inches wide, and 9 inches long. This canister can be installed into a mounting module (such as the one labeled 200 in FIG. 8A) made of sheet metal and plastic components, and known electronic circuitry, using known assembly techniques, having the following approximate dimensions: 14" high, 19" wide, 30" long.

While certain representative embodiments and details have been shown for the purpose of illustrating the invention, those skilled in the art will readily appreciate that various modifications may be made to the invention without departing from the novel teachings or scope of this invention. Accordingly, all such modifications are intended to be included within the scope of this invention as defined in the following claims. In the claims, any means-plus-function clauses used are intended to cover the structures described herein as performing the recited function and not only structural equivalents but also equivalent structures.

What is claimed is:

1. A vibration dampening mechanism for operative arrangement with a data storage media drive canister, comprising:

a cantilevered dampening spring secured to a surface of a side of a housing for the drive canister, said side having an aperture therethrough;

said spring having a free end and a bend portion: and whereby installation of the drive canister into a canister support structure causes said bend portion to contact an undersurface of said support structure and remain at least partially flattened while so installed, said free end extending over said aperture.

2. The mechanism of claim 1 wherein said bend portion has an outer bend surface shaped to comprise an arc having a radius of approximately 1 inch and while the drive canister is so installed, said free end extends into said aperture a distance approximately equal to a thickness of said side.

3. The mechanism of claim 1 wherein, while the drive canister is so installed, said free end to deflect through said aperture and into an interior cavity of said drive canister.

4. The mechanism of claim 1 wherein said bend portion has an outer bend surface with an inverted V-shape, and while the drive canister is so installed. said free end extends into said aperture.

5. The mechanism of claim 1 wherein said bend portion has an outer bend surface that is generally hook-shaped and said free end extends over and into said aperture prior to said installation, and while the drive canister is so installed, said free end extends further into said aperture.

6. The mechanism of claim 1 wherein said bend portion has an outer bend surface shaped to comprise three adjacent arcs, said free end extends over and into said aperture prior to said installation, and while the drive canister is so installed, said free end extends further into said aperture.

7. The mechanism of claim 1 wherein:

a secured end of said spring at which it is so secured has a generally planar portion;

said canister housing further comprises front and back ends, said spring being located closer to said front end than said back end;

and while the drive canister is so installed, said free end extends into said aperture.

8. The mechanism of claim 4 wherein:

said canister housing further comprises front and back ends, mounted to said back end is an electrical connector, said spring being located closer to said front end than said back end.

9. The mechanism of claim 7 wherein said generally planar portion has a hole for accepting a screw, and said free end is positioned between said secured end and said canister housing front end.

10. The mechanism of claim 7 wherein said generally planar portion has an underside comprising an adhesive for contact with an outer surface of said side, and said secured end is positioned between said free end and said canister housing front end.

11. The system of claim 7 wherein while the drive canister is so installed, said free end extends through said aperture and into an interior cavity of the drive canister, and said generally planar portion is thermally bonded to an outer surface of said side.

12. The system of claim 7 wherein said bend portion has an outer bend surface shaped to comprise an arc having a radius, said generally planar portion is welded to said side, and pivotally mounted in proximity to said spring is a latch-door to generally cover said canister housing front end.

13. The system of claim 7 wherein:

said generally planar portion has a hole and a screw therethrough; and said canister support structure is a cage within a computing device.

14. A vibration dampening mechanism for operative arrangement with a data storage media drive canister, comprising:

a cantilevered dampening spring secured to a side of a housing for the drive canister, said side having an aperture therethrough;

said spring having a bent portion between a secured end and a free end;

said bent portion having an outer bend surface in contact with an under surface of a support structure into which the drive canister housing has been installed, said free end extending over said aperture.

15. A vibration dampening mechanism for operative arrangement with a data storage media drive canister, comprising:

a cantilevered dampening spring integral with a side of a housing for the drive canister, said side having an aperture therethrough;

said spring having a free end and a bend portion; and whereby installation of the drive canister into a canister support structure causes said bend portion to contact an undersurface of said support structure and remain at least partially flattened while so installed said free end extending over said aperture.

16. The mechanism of claim 15 wherein: said canister housing further comprises front and back ends, said spring being located closer to said front end than said back end; and said bend portion has an outer bend surface with an inverted V-shape.

17. The mechanism of claim 16 wherein:

said canister support structure is a bay within a mounting module into which a plurality of the media drive canisters can be installed side-by-side;

said free end is positioned between an integral end of said spring and said canister housing front end; and while the drive canister is so installed, said free end extends into said aperture.

18. A vibration dampening mechanism for operative arrangement with a data storage media drive canister, comprising:

a cantilevered dampening spring integral with a side of a housing for the drive canister, said side having an aperture therethrough;

said spring having a free end extending over said aperture said a bend portion;

pivotally mounted in proximity to said spring is a latch-door to generally cover a canister housing front end; and upon closing said latch-door against said front end, an outer bend surface of said bend portion in contact with an under surface of a canister support structure causes said bent portion to at least partially flatten.

19. A storage media drive vibration dampening system for operation with a media drive canister support structure, comprising:

a cantilevered dampening spring integral with a side of a drive canister housing;

said spring having a bent portion between an integral end and a free end; and said bent portion having an outer bend surface that is in contact with an under surface of the support structure into which the drive canister housing has been installed causing said bend portion to remain at least partially flattened.

20. The system of claim 19 wherein:

said canister housing further comprises front and back ends, said spring being located closer to said front end than said back end; and extending over and into an aperture through said side.

21. A method of dampening the vibration of a data storage media drive in operation, comprising the steps of:

providing a cantilevered dampening spring secured to a surface of a side of a drive canister housing containing the media drive, said side having an aperture therethrough over which a free end of said spring can extend; and contacting an outer bend surface of a bent portion of said spring with an under surface of a canister support structure to cause said bent portion to at least partially flatten while said drive canister housing is installed into said canister support structure.

22. The method of claim 21 wherein said outer bend surface is an inverted V-shape, said step of contacting further causes said free end to extend over and into said aperture, and said step of contacting further comprises sliding said drive canister housing into place within said canister support structure comprising a bay.

23. The method of claim 21 wherein: said canister housing further comprises front and back ends, said spring being located closer to said front end than said back end; pivotally mounted in proximity to said spring is a latch-door to generally cover said front end; and said step of contacting further comprises closing said latch-door against said front end.

24. A method of dampening the vibration of a data storage media drive in operation, comprising the steps of:

providing a cantilevered dampening spring integral with a side of a drive canister housing containing the media drive, said side having an aperture therethrough over which a free end of said spring extends; and contacting an outer bend surface of a bent portion of said spring with an under surface of a canister support structure to cause said bent portion to at least partially flatten while said drive canister housing is installed into said canister support structure.

25. The method of claim 24 wherein said outer bend surface is shaped to comprise an arc having a radius, and said step of contacting further comprises sliding said drive canister housing into place within said canister support structure causing said free end to extend over and into said aperture.

26. The method of claim 24 wherein pivotally mounted in proximity to said spring is a latch-door to generally cover a front end of said canister housing, and said step of contacting further comprises closing said latch-door against said front end.

* * * * *